United States Patent
Irie

[15] 3,696,839
[45] Oct. 10, 1972

[54] HYDRAULIC SERVO VALVE
[72] Inventor: Namio Irie, Yokohama, Japan
[73] Assignee: Nissan Motor Company, Limited, Yokohama City, Japan
[22] Filed: Sept. 3, 1970
[21] Appl. No.: 69,393

[30] Foreign Application Priority Data
Sept. 5, 1969 Japan ..................44/69959

[52] U.S. Cl. ..........................................137/625.61
[51] Int. Cl. ........................F16b 5/00, F16k 11/07
[58] Field of Search..................137/625.61, 83, 85

[56] References Cited
UNITED STATES PATENTS
3,055,383 9/1962 Payne................137/625.61 X

*Primary Examiner*—Henry T. Klinksiek
*Attorney*—McCarthy, Depaoli, O'Brien & Price

[57] ABSTRACT

A hydraulic servo valve for controlling the direction of a fluid flow, which servo valve comprises a valve unit including a valve spool moved by a fluid pressure in a hydraulic fluid circuit, and an actuator to control the movement of the valve spool in accordance with electric signals that it receives, said valve unit having a pressure regulating portion for reducing the amount of leaks of an operating fluid.

3 Claims, 5 Drawing Figures

INVENTOR
NAMIO IRIE
BY
McCarthy, Depaoli & O'Brien
ATTORNEYS

HYDRAULIC SERVO VALVE

This invention relates to an improvement in a hydraulic servo valve for controlling the direction of a fluid flow under pressure.

Among the prior art hydraulic servo valves is a valve of pin pilot type using a pilot valve to convert electric signals into mechanical thereby to move a main valve requiring a large capacity for actuating means such as a solenoid device and a torque motor. The pilot valve is complicated in construction so as to add to the production cost of the servo valve as a whole. The use of the pilot valve is, moreover, reflected by a retarded response of the main valve to the operating signals supplied thereto.

Another typical practice is to use a combination orifice and nozzle valve of flapper type, in which an extra amount of operating fluid is required to compensate for a loss resulting from the draining off of a signal pressure when the nozzle is open and, as a result, the hydraulic pump tends to be over-loaded.

It is, therefore, an object of the invention to provide an improved hydraulic servo valve which is simple in construction and economical to manufacture.

Another object of the invention is to provide a hydraulic servo valve in which a loss in the operating fluid as caused in draining off the signal pressure in the known servo valves is reduced to a minimum whereby the hydraulic pump is prevented from being subjected to an over-load.

Still another object of the invention is to provide a hydraulic servo valve offering a quick response to the operating signals.

The drawbacks experienced in the prior art devices and the advantages of the hydraulic servo valve embodying the invention will be more apparent from the following description taken in conjunction with the accompanying drawings.

Figure 1:
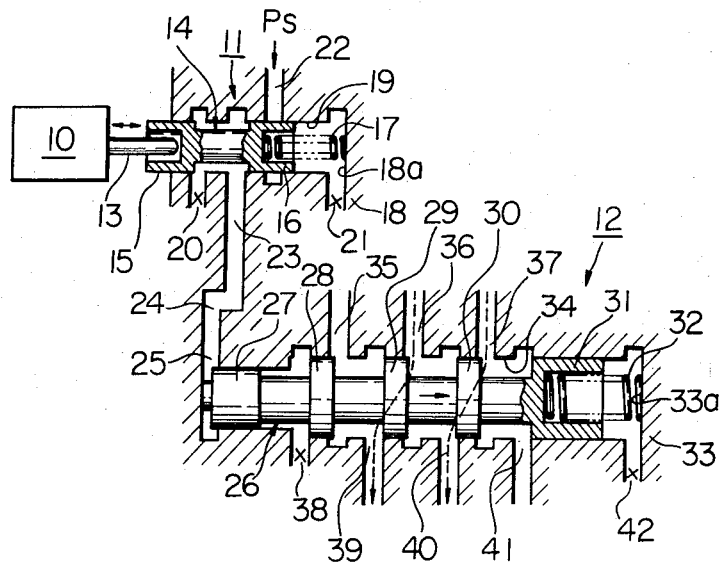
FIGS. 1 and 2 are views schematically illustrating examples of the conventional hydraulic servo valve.

A hydraulic servo valve of known construction is, as shown in FIG. 1, constituted essentially by an actuator 10 serving as a control valve to control the operation of the hydraulic servo valve, a pilot valve 11 actuated by the pilot valve 10, and a main valve 12 interposed in a hydraulic circuit and controlled by the pilot valve 11. The main valve 12 is herein shown as held in its neutral position.

The actuator 10, which may be a solenoid device or a torque motor of known construction, has a plunger 13 which is moved in response to an operating signal for actuating the pilot valve 11.

The pilot valve 11 includes a pilot valve spool 14 having spaced lands 15 and 16. A spring 17 is provided between the land 16 and a stationary part 18a of a casing portion 18 whereby the valve spool 14 is normally biased away from the stationary part 18a. The casing portion 18 is provided with a cylindrical cavity 19 in which the pilot valve spool 14 is slidably disposed. The cylindrical cavity 19 has a plurality of ports 20, 21, 22 and 23. The ports 20 and 21 are drain ports. The port 22 is connected to a source of fluid pressure (not shown). The port 23 is connected to a conduit 24 which in turn is connected to a port 25. The communication between the ports 22 and 23 is established by the operation of the pilot valve 11, whereby a pressurized fluid is admitted into the conduit 24 from which it is applied to the main valve 12 to control the same.

The main valve 12 includes a main valve spool 26 having a plurality of spaced lands 27, 28, 29, 30 and 31. A spring 32 is provided between the land 31 and a stationary part 33a of a main valve body 33 so that the main valve spool 26 is normally biased away from the stationary part 33a. The main valve body 33 is provided with a cylindrical cavity 34 in which the main valve spool 26 is slidably disposed.

The cylindrical cavity 34 has a plurality of ports 35, 36, 37, 38, 39, 40, 41 and 42. The ports 35, 36 and 37 are connected to a source of fluid pressure, not shown, respectively. The ports 39, 40 and 41 are connected to a suitable device, such as for example a servo mechanism of an automotive power transmission system. The ports 38 and 42 are drain ports.

When, in operation, the actuator 10 is energized, the plunger 13 protrudes against the force of the spring 17, so that the valve spool 14 is moved toward the stationary part 18a position, the port 22 communicates with the port 23, thereby passing the pressurized fluid into the port 25. Thus, the pressurized fluid acts on the land 27, whereby the valve spool 26 is moved in the direction of the arrow in a solid line. Accordingly, the operating fluids in the ports 36 and 37 are now flown into the ports 39 and 40 respectively as indicated by an arrow in a broken line while the operating fluid in the port 35 is drained off through the drain port 38.

When, now, the actuator 10 is de-energized, then the plunger 13 becomes retracted, so that the pilot valve spool 14 is moved away from the stationary part 18a by the force of the spring 17, thereby interrupting the communication between the ports 22 and 23. In this instance, the pressurized fluid in the conduit 24 is drained off through the drain port 20, so that the fluid pressure in the port 25 remains to yield to the force of the spring 32. Accordingly, the main valve spool 26 is caused to move away from the stationary part 33a by the force of the spring 32. Thus, the operating fluids in the ports 35, 36 and 37 are permitted to pass into the ports 39, 40 and 41 respectively.

As will be apparent from the above discussion, difficulties are encountered in this prior art servo valve in moving the main valve in quick response to the operating signals and in reducing the capacity required of the actuator.

Figure 2:
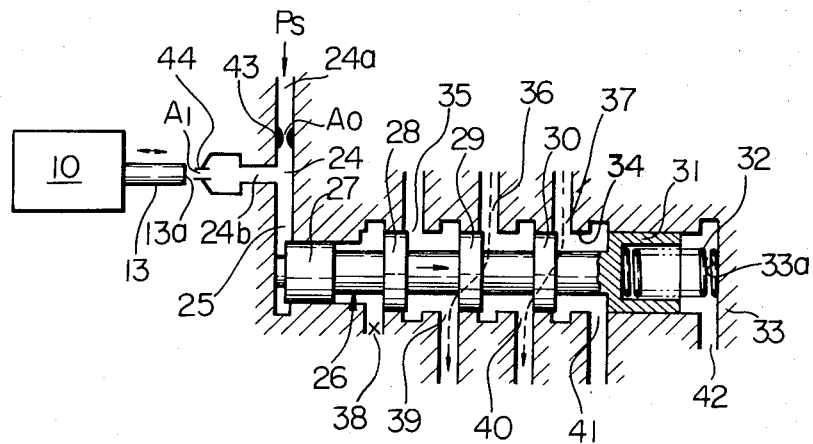

FIG. 2 illustrates another known hydraulic servo valve eliminating these drawbacks, the servo valve being different from that shown in FIG. 1 in that an orifice and a nozzle are used to control the main valve.

As shown, the conduit 24 is connected to a fluid inlet conduit 24a which communicates with the source of fluid under pressure (not shown). An orifice 43 is provided between the conduits 24 and 24a. The conduit 24 is also connected to a branch conduit 24b which is opened to the outside through a restriction or nozzle 44 from which the operating fluid is drained off. Designated by reference numeral 13a is a valve head which is directed in a face-to-face relationship toward the nozzle 44.

The nozzle 44 is sized to be greater in the effective sectional area than the orifice 43 for the reason hereinafter discussed.

When, in operation, the actuator 10 is energized, then the plunger 13 moves toward the nozzle 44, thereby closing the same. At this instant, the fluid pressure in the conduit 24 increases to the level of that existing in the fluid inlet conduit 24a. Accordingly, the fluid pressure acting on the land 27 overcomes the force of the spring 32, so that the valve spool 26 is moved in the direction of the arrow in a solid line. Thus, the passage of the operating fluid is changed, whereby the operating fluid is flown in the direction as indicated by an arrow in a broken line.

When, now, the actuator 10 is de-energized, then the plunger 13 becomes retracted so that the valve head 13a leaves the nozzle 44, which consequently is opened. The operating fluid in the conduit 24 is then discharged through the nozzle 44. In this instance, the fluid pressure P in the conduit 24 may be expressed as:

$$P = \frac{P_s(A_0/A_1)^2}{1+(A_0/A_1)^2},$$

where $P_s$ stands for the fluid pressure in the fluid inlet conduit 24a, $A_0$ for the effective area of the orifice 43, and $A_1$ for the effective sectioned area of the nozzle 44.

As described above, the effective sectional area $A_1$ of the nozzle 44 is greater than that $A_0$ of the orifice 44, so that the fluid pressure P in the conduit 24 is considerably lower than the fluid pressure $P_s$ in the fluid inlet conduit 24a. Accordingly, the fluid pressure P acting on the land 27 remains to yield to the force of the spring 32, whereby the valve spool 26 is biased leftwardly by the force of the spring 32.

As will be understood from the above description, the prior art hydraulic servo valve of FIG. 2 has advantages that it obviates the necessity of providing the pilot valve and that the capacity of the actuator can be reduced to such an extent as to preclude the jetting of the operating fluid from the nozzle 44. This servo valve, however, has a drawback in that an extra amount of operating fluid is required because of a loss resulting from the leakage of the fluid when the nozzle is open.

Figure 3:
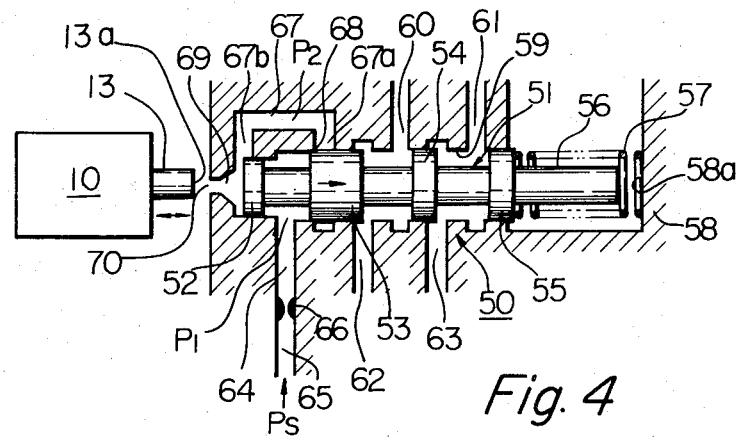
FIG. 3 is a view showing a hydraulic servo valve embodying the invention.

All of the above mentioned disadvantages inherent in the prior art servo valves can be overcome in the hydraulic servo valve according to the invention, of which a preferred example is shown in FIG. 3.

In FIG. 3, the hydraulic servo valve implementing the invention includes a valve unit 50 which is disposed in a hydraulic fluid circuit, and an actuator 10 to control the valve unit 50.

The valve unit 50 comprises a valve spool 51 having spaced lands 52, 53, 54 and 55. The land 52 is sized to be smaller in effective area than that of the land 53. The land 55 is provided with a projection 56 to support a compression spring 57. The spring 57 is positioned between the land 55 and a stationary part 58a of a casing portion 58 whereby the valve spool 51 is biased away from the stationary part 58a. The casing portion 58 is provided with a cylindrical cavity 59 in which the valve spool 51 is slidably disposed. The cylindrical cavity 59 has a plurality of ports 60, 61, 62 63 and 64. The ports 60 and 61 are connected with a suitable source of fluid under pressure while the ports 62 and 63 are connected to a suitable device operated with the fluid pressure. The port 54 is connected to a fluid pressure supply conduit 65 in which an orifice 66 is provided for the reason hereinafter discussed.

The cylindrical cavity 59 is also provided with a by-pass passage 67. The by-pass passage 67 has an inlet port 67a which selectively communicates with the port 64. A pressure regulating portion 68 is defined between the land 53 and inlet port 67a by the action of the force of the spring 57 and of the fluid pressure acting on the land 53 in a manner later to be discussed in detail.

The outlet port 67b communicates with a fluid chamber 69 which is defined by the land 52 and cylindrical cavity 59. The fluid chamber 69 is opened to the outside through a restriction or nozzle 70. The nozzle 70 is sized to be greater in effective sectional area than the orifice 66. Provided in a face-to-face relationship with the nozzle 70 is a valve head 13a of a plunger 13.

When in operation, the actuator 10 is energized, then the plunger 13 protrudes so that the valve head 13a is brought into closing contact with the nozzle 70. The nozzle 70 being closed, the fluid pressure in the fluid chamber 69 communicating with the by-pass passage 67 increases. This tends to cause the valve spool 51 to move toward the stationary part 58a against the force of the spring 57. With this movement, an opening area of the pressure regulating portion 68 increases, admitting the operating fluid in the port 64 into the by-pass passage 67. Since, at this instant, the nozzle 70 is in a closed position, the fluid pressure in the by-pass passage 67 increases gradually, thereby biasing the valve spool 51 more strongly toward the stationary part 58a of the casing portion 58. Thus, the flow path of the operating fluid is changed.

When, now, the actuator 10 is de-energized, then the plunger 13 becomes retracted so that the valve head 13a leaves the nozzle 70, which consequently is opened. The fluid obtaining in the fluid chamber 69 is then discharged through the nozzle 70 for recollection. In this instance, the operating fluid supplied to the conduit 65 passes into the port 64 through the orifice 66. The fluid pressure in the port 64 is indicated by $P_1$.

Assuming that the fluid pressure in the by-pass passage 67 is $P_2$, the fluid pressure $P_2$ acts on the land 52, while the fluid pressure $P_1$ acts on the differential area between the lands 52 and 53. Thus, the combined opposing forces are exerted to the spring 57. If, in this instance, the opening area of the pressure regulating portion 68 is larger than that of the orifice 66, the fluid pressure $P_2$ in the by-pass passage 67 may be considered to be zero as compared to the fluid pressure $P_s$. Assuming, therefore, that a pressure effected by the spring 57 is $P_0$, the pressure $P_1$ will be equal to the pressure $P_0$, which expressed as:

$$P_0 = P_1 = \frac{F_{sp}}{S_B - S_A},$$

where $F_{sp}$ represents the force of the spring, $S_A$ the effective area of the land 52, and $S_B$ the effective area of the land 53.

If the pressure $P_1$ is higher than the pressure $P_0$, the valve spool 53 moves toward the stationary part 58a of the drawing, thereby causing the operating fluid to pass into the by-pass passage 67. Thus, the pressure $P_1$ decreases. On the other hand, if the pressure $P_1$ is lower than the pressure $P_0$, the pressure regulating portion 68 is completely closed by the land 53. Thus, the fluid pressure in the port 64 is at all time regulated to the level of the pressure $P_0$ under the influence of the pressure regulating portion 68, reducing the leaks of the operating fluid to a minimum. These amount, Q, of leaks will be obtained from the following equation:

$$Q = CA_0 \frac{2(P_s - P_0)}{\rho}.$$

where $C$ is a constant determined by the dimensions of the orifice 66 and the pressure of the operating fluid to be used, $A_0$ the effective sectional area of the orifice 66, and $\rho$ a viscosity coefficient of the operating fluid.

It will be appreciated from the foregoing description that, in accordance with the invention, the amount of leaks can be significantly reduced as compared to the prior art devices. This will be understood from observation of FIG. 5, which graphically shows the relationship between the amount of leaks Q and the fluid pressure $P_s$ to be supplied. The curve A indicates the amount of leaks which is obtained by the prior art devices and the curve B indicates the amount of leaks which is achieved by the hydraulic servo valve according to the invention. It will be understood that the amount Q of leaks in substantially zero even when the nozzle is kept open, provided the fluid pressure $P_s$ is equal to the pressure $P_0$. In practice, the fluid pressure $P_s$ should preferably be slightly higher than the pressure $P_0$, as indicated by point $a$ in the graph of FIG. 5.

Figure 5:
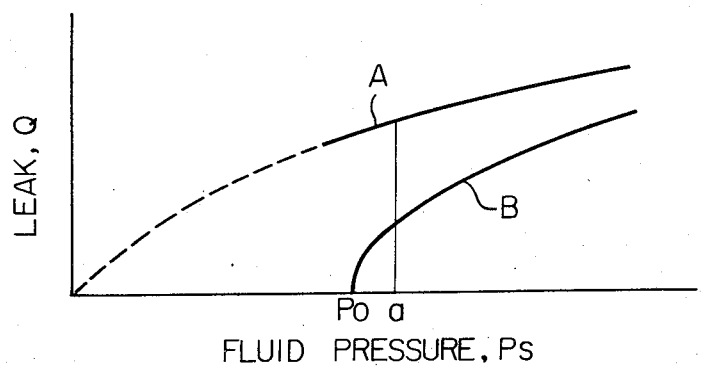
FIG. 5 is a graph illustrating the variation in the amount of leaks of the operating fluid in terms of the hydraulic pressures supplied.

It will be understood from FIG. 5 that the amount of leaks is also reduced considerably even when the fluid pressure $P_s$ is utilized at a given value shown by the point $a$ in FIG. 5.

Figure 4:
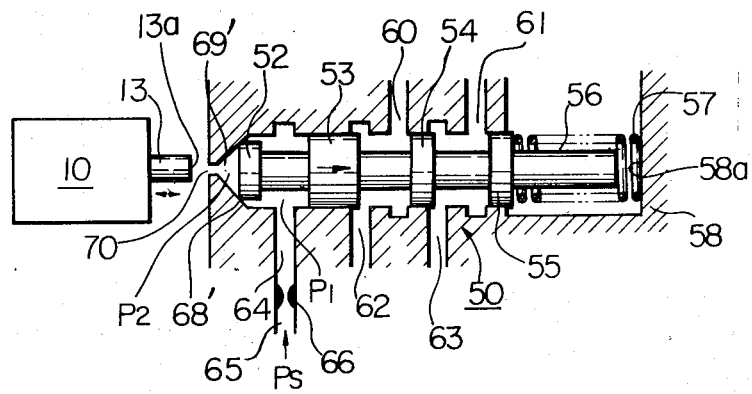
FIG. 4 is similar to FIG. 3 but illustrates a modified form of the hydraulic servo valve according to the invention.

A second embodiment or modification according to the invention is illustrated in FIG. 4 wherein like parts are designated by like numerals corresponding to those used in connection with FIG. 3. This second embodiment differs from the first embodiment only in that the fluid chamber, 69', is conically shaped and has its circumferential face disposed for contact with the marginal periphery of the land 52 of the valve spool 51, thus defining a pressure regulating portion 68'. This arrangement dispenses with the provision the by-pass passage 67 as used in the first embodiment. Similar results will be obtained so that a detailed description is omitted herefrom.

Having thus described the invention, it will be understood that various changes and modifications may be made in the specific form and construction described and illustrated herein, without departing from the scope of the appended claims.

What is claimed is:

1. A hydraulic servo valve for controlling the direction of a fluid flow under pressure, comprising a valve unit interposed in a hydraulic fluid circuit, and an actuator connected to a power source for controlling the operation of said valve unit, said valve unit including a valve spool which is moved responsive to a fluid pressure applied thereto through said fluid circuit, a spring for biasing said valve spool, a nozzle provided in said fluid circuit and opened to the outside of said valve unit for discharging an excess fluid from the fluid circuit, said nozzle being closed with actuation of said actuator, an orifice which is provided in said fluid circuit for applying a fluid pressure to said valve spool to cause the valve spool to move against the force of said spring to change the direction of said fluid flow, said orifice being smaller in the effective sectional area than said nozzle, and a variable pressure regulating portion which is positioned between said orifice and nozzle in said fluid circuit for regulating said fluid pressure applied to said valve spool to control the degree of communication between said orifice and nozzle when the nozzle is kept open, said variable pressure regulating portion being defined by the action of force of said spring and of the fluid pressure to be applied to said valve spool.

2. A hydraulic servo valve according to claim 1, wherein said pressure regulating portion is defined by said valve spool and a by-pass passage which is provided between said orifice and nozzle.

3. A hydraulic servo valve according to claim 1, wherein said pressure regulating portion is defined by said valve spool and a fluid chamber which is provided between said nozzle and orifice.

* * * * *